US012254177B2

(12) United States Patent
Chen et al.

(10) Patent No.: US 12,254,177 B2
(45) Date of Patent: Mar. 18, 2025

(54) SYSTEMS AND METHODS FOR ESTABLISHING SCALABLE STORAGE TARGETS

(71) Applicant: Dell Products L.P., Round Rock, TX (US)

(72) Inventors: Xiangping Chen, Harvard, MA (US); Walter A. O'Brien, III, Westborough, MA (US); Xunce Zhou, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 17/957,203

(22) Filed: Sep. 30, 2022

(65) Prior Publication Data

US 2024/0111414 A1 Apr. 4, 2024

(51) Int. Cl.
*G06F 3/06* (2006.01)

(52) U.S. Cl.
CPC .......... *G06F 3/0604* (2013.01); *G06F 3/0631* (2013.01); *G06F 3/0659* (2013.01); *G06F 3/067* (2013.01)

(58) Field of Classification Search
CPC .... G06F 3/0604; G06F 3/0631; G06F 3/0659; G06F 3/067
See application file for complete search history.

(56) References Cited

U.S. PATENT DOCUMENTS 11,552,844 B1 * 1/2023 Ahles ................. H04L 41/0893

OTHER PUBLICATIONS

StarWind Hyperconvergence, StarWind NVMe-oF Initiator for Windows, StarWind NVMe-oF Initiator for Windows, White Paper, Updated: Jun. 28, 2022 (3 pages).
StarWind Software, Inc., StarWind NVMe over Fabrics (NVMe-oF), StarWind NVMe over Fabrics (NVMe-oF) Updated: Jun. 28, 2022 (6 pages).

* cited by examiner

*Primary Examiner* — Idriss N Alrobaye
*Assistant Examiner* — Richard B Franklin
(74) *Attorney, Agent, or Firm* — Aly Z. Dossa; Chamberlain, Hrdlicka, White, Williams & Aughtry

(57) ABSTRACT

A method for facilitating a connection to a storage volume, that includes receiving, by a storage manager, an access request from compute node, where the access request includes a storage volume identifier associated with the storage volume, performing a lookup, in a target database, to identify a target entry that includes the storage volume identifier, making a first determination that the target database does not comprise the target entry, and based on the first determination, creating a first storage target cluster for the storage volume, and sending first connection instructions to the compute node, where the first connection instructions comprise a first storage target cluster identifier associated with the first storage target cluster.

16 Claims, 6 Drawing Sheets

SYSTEMS AND METHODS FOR ESTABLISHING SCALABLE STORAGE TARGETS

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

Figure 1:
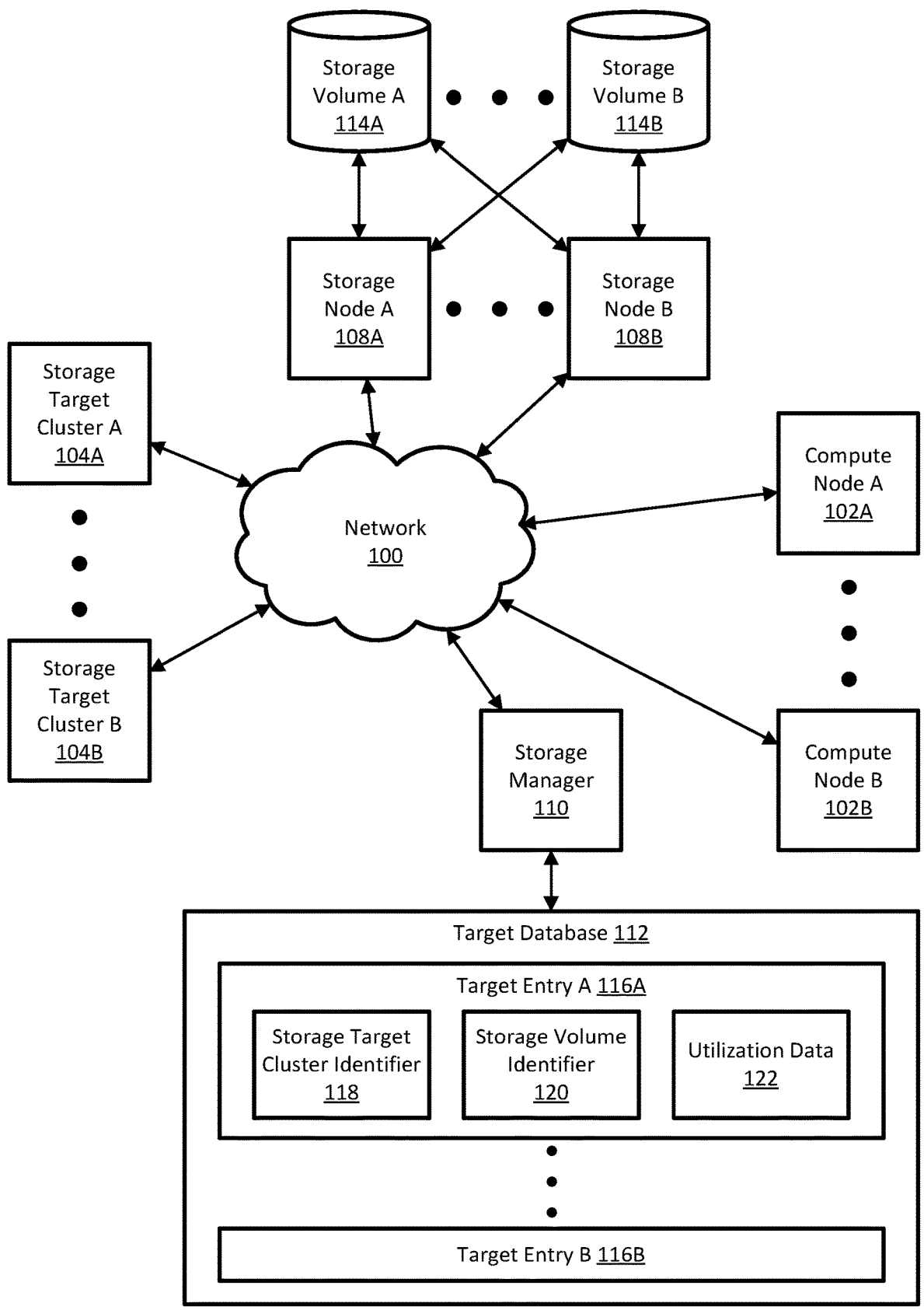
FIG. 1 shows a diagram of system, in accordance with one or more embodiments.

In general, embodiments relate to systems and methods for establishing storage targets that provide scalable access to storage volumes. In conventional systems, each compute node that connects to a storage volume must establish a connection with each storage node on which that storage volume, at least, partly resides. That is, if a logical storage volume physically persists across multiple storage nodes (each having their own storage devices, network interface, internet protocol (IP) address, etc.), any compute node that accesses the storage volume would need to create individual connections to each storage node on which that storage volume persists. As an example, if a storage volume persists across four storage nodes, and ten compute nodes mount that storage volume—forty individual connections would be created (i.e., each of the ten compute nodes would make four connections to each storage node).

Further, compute nodes may implement some protocols and technologies that have limits that are easily met (e.g., NVMe-oF connections may be limited to four or eight individual connections). In conventional systems where compute nodes and storage nodes may be regularly introduced (i.e., the system is 'scaled up'), the number of potential connections increases dramatically (and can easily surpass the limits of the existing technology). For example, adding a storage node to an existing storage volume (e.g., for redundancy, capacity, etc.) may require adding dozens of new connections (to each existing compute node) in order to allow access.

Accordingly, as described in one or more embodiments herein, systems and methods are provided that allow for the creation of storage targets (and larger storage target clusters) that provide a simplified endpoint to access a storage volume via a layer of logical indirection. As a non-limiting example, if a storage volume persists across six storage nodes, a storage target cluster is established for that storage volume. In that storage target cluster, one or more storage targets are generated that each connect to the six storage nodes for the storage volume. In turn, any compute node requesting access to the storage volume simply accesses one or more of the storage targets—without establishing direct connections to each of the six storage nodes.

Further, as discussed in one or more embodiments herein, additional compute nodes may be added to the system and provided access to the storage volume via the storage target cluster, without needing to connect to each storage node independently. Similarly, the storage volume may be modified to include an additional storage node, where that newly-added storage node connects to the storage target cluster (and not any compute node individually). Thus, the system may be scaled (e.g., adding/removing compute/storage nodes) while maintaining a manageable number of connections that are less likely to exceed the connection capacity of any single node (compared to conventional systems).

Specific embodiments will now be described with reference to the accompanying figures. In the following description, numerous details are set forth as examples of one or more embodiments. One of ordinary skill in the art, having the benefit of this detailed description, would appreciate that one or more embodiments in this disclosure may be practiced without the specific details disclosed and that numerous variations or modifications may be possible and still remain in the scope of this detailed description. Certain details, known to those of ordinary skill in the art, may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

As used herein, the adjectives "source", "destination", and "intermediate" are for explanatory purposes only. That is, the components, devices, and collections of devices described using these adjectives are meant only to provide a better understanding in the context of a particular scenario—not to generally limit the capabilities of those components, devices, and collections of devices. As an example, a "component" may perform certain operations when acting as a "source component" and may perform some of the same and other operations when acting as a "destination component". However, each "component" (whether "source" or "destination") may be fully capable of performing the operations of either role.

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

FIG. 1 shows a diagram of a system, in accordance with one or more embodiments. In one or more embodiments, a system may include a network (100), one or more compute node(s) (102), one or more storage node(s) (108), one or more storage volume(s) (114), one or more storage target cluster(s) (104), a storage manager (110), and a target database (112). Each of these components is described below.

In one or more embodiments, a network (e.g., network (100)) is a collection of connected network devices (not shown) that allow for the communication of data from one network device (not shown) to other network devices (not shown), or the sharing of resources among network devices (not shown). Non-limiting examples of a network (100) include a local area network (LAN), a wide area network (WAN) (e.g., the Internet), a mobile network, any combination thereof, or any other type of network that allows for the communication of data and sharing of resources among network devices and/or devices operatively connected to the network (100). One of ordinary skill in the art, having the benefit of this detailed description, would appreciate that a network is a collection of operatively connected computing devices that enables communication between those computing devices.

In one or more embodiments, a computing device is hardware that includes one or more of the following components:
  (i) processor(s),
  (ii) memory (volatile and/or non-volatile),
  (iii) persistent storage device(s) (e.g., integrated circuit storage devices (e.g., solid-state drive (SSD), Non-Volatile Memory Express (NVMe), flash memory, etc.), magnetic storage (e.g., hard disk drive (HDD), floppy disk, tape, diskette, etc.)),
  (iv) internal physical interface(s) (e.g., serial advanced technology attachment (SATA) ports, peripheral component interconnect (PCI) ports, PCI express (PCIe) ports, next generation form factor (NGFF) ports, M.2 ports, etc.),
  (v) external physical interface(s) (e.g., universal serial bus (USB) ports, recommended standard (RS) serial ports, audio/visual ports, etc.),
  (vi) communication interface(s) (e.g., network ports, small form-factor pluggable (SFP) ports, wireless network devices, etc.), and
  (vii) input and output device(s) (e.g., mouse, keyboard, monitor, other human interface devices, compact disc (CD) drive, other non-transitory computer readable medium (CRM) drives).

Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions. Non-limiting examples of a computing device include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device with the aforementioned capabilities.

In one or more embodiments, a compute node (e.g., compute node A (102A), compute node B (102B)) is a computing device that executes software and performs one or more operation(s). A compute node (102) may be a general-purpose computing device configured to perform any capable task requested by a user. In one or more embodiments, a compute node (102) may access (read and/or write) data to memory and/or persistent storage device(s) (not shown) on one or more storage node(s) (108) via an NVMe over fabric (NVMe-of) protocol, a remote direct memory access (RDMA) protocol, a network file system (NFS) protocol. A compute node (102) may execute connection software (not shown) that facilities the connection between the compute node (102) and one or more storage endpoint(s) (e.g., a storage target, a storage node (108)) over a network (100). As a non-limiting example, the storage nodes (108) may persist data on NVMe storage devices (not shown) where a compute node (102) may execute connection software that is configured to connect to and access the NVMe drives of the storage nodes (108). Connection software may have limited connection capacities (e.g., allowing for a maximum of four or eight connections, total). As used herein, when referring to the 'connection' between a compute node (102) and a storage endpoint (e.g., a storage target, a storage node (108)), the 'connection' refers to the functionality and operation of the connection software (not shown) executing on the compute node (102).

In one or more embodiments, a storage node (e.g., storage node A (108A), storage node B (108B)) is a computing device that, at least, executes software configured to handle (read and/or write) data to memory and/or storage device(s) of the storage node (108). Data stored on one or more storage device(s) (108) across one or more storage node(s) (108) may be logically grouped into one or more storage volume(s) (114).

In one or more embodiments, a storage volume (e.g., storage volume A (114A), storage volume B (114B)) is a logical storage structure that stores data for use by one or more compute node(s) (102). A storage volume (114) may be allocated (i) across one entire physical storage device, (ii) on a portion of one physical storage device, (iii) across two or more physical storage devices, (iv) across two or more portions of two or more physical storage devices, and/or (v) any combination thereof. Further, in one or more embodiments, when a storage volume persists across two or more physical storage devices, those storage devices may be located in two or more storage nodes (108) operatively connected via a network (100). Accordingly, in one or more embodiments, a storage volume (114) provides a logical namespace that acts as a layer of indirection between software utilizing the data and the data itself (e.g., software executing on a compute node (102) and the underlying physical storage devices located across one or more storage node(s) (108)). Non-limiting examples of a storage volume (114) include an NVMe namespace, an NFS share, a redundant array of independent disks (RAID) array.

In one or more embodiments, a storage target cluster (e.g., storage target cluster A (104A), storage target cluster B (104B)) is a grouping of one or more storage target(s) (not shown). Additional details regarding storage target clusters and storage targets may be found in the description of FIG. 2.

In one or more embodiments, a storage manager (e.g., storage manager (110)) is software that manages (e.g., creates, monitors, facilitates, modifies, removes) storage node(s) (108), storage volume(s) (114), storage target(s) (not shown), and the connections between compute node(s) (102) and storage node(s) (108) (e.g., via the storage target(s)). A storage manager (110) may execute on any compute node (102), storage node (108), or other node (not shown) in the system. Further, a storage manager (110) may maintain a target database (112) as part of the process of managing one or more storage target(s) and may perform some or all of the methods shown in FIGS. 3 and 4.

In one or more embodiments, a target database (e.g., target database (112)) is a data structure (e.g., a table, a delimited text file, a database file, etc.) that includes one or more target entries (116). A target database (112) may be modified (e.g., have data written to it) by a storage manager (110) and may be accessed by any node (e.g., a compute node (102), a storage node (108)) operatively connected to the network (100). A target database (112) may be stored on any node in the system with or apart from the storage manager (110). Regardless, in one or more embodiments, the target database (112) may be considered a part (i.e., subcomponent) of the storage manager (110).

In one or more embodiments, a target entry (e.g., target entry A (116A), target entry B (116B)) is a data structure within the target database (112) (e.g., a row in a table, a delimited entry, etc.) and may include one or more of the following:

(i) a storage target cluster identifier (118) that allows for the unique identification of a single storage target cluster (104). In one or more embodiments, a storage target cluster identifier (118) also uniquely identifies the node (102, 108) hosting the storage target cluster (104). Non-limiting examples of an identifier include a unique tag, alphanumeric entry, a filename, and a row number in table, (ii) a storage volume identifier (120) that allows for the unique identification of a single storage volume (114), and (iii) utilization data (122) that provides data related to the active connections to each individual storage target (not shown) in the storage target cluster (104) identified by storage target cluster identifier (118). In one or more embodiments, the utilization data (122) provides information about the resources consumed by the storage target cluster (104) on the node (102, 08) hosting the storage target cluster (104) (e.g., processor utilization, memory utilization, interface bandwidth utilization, etc.). That is, utilization data (122) may be provided as a percentage of the total resource capacity of the node (102, 108) hosting the storage target cluster (104).

While FIG. 1 shows a specific configuration of a system, other configurations may be used without departing from the scope of the disclosed embodiments. Accordingly, embodiments disclosed herein should not be limited to the configuration of devices and/or components shown in FIG. 1.

Figure 2:
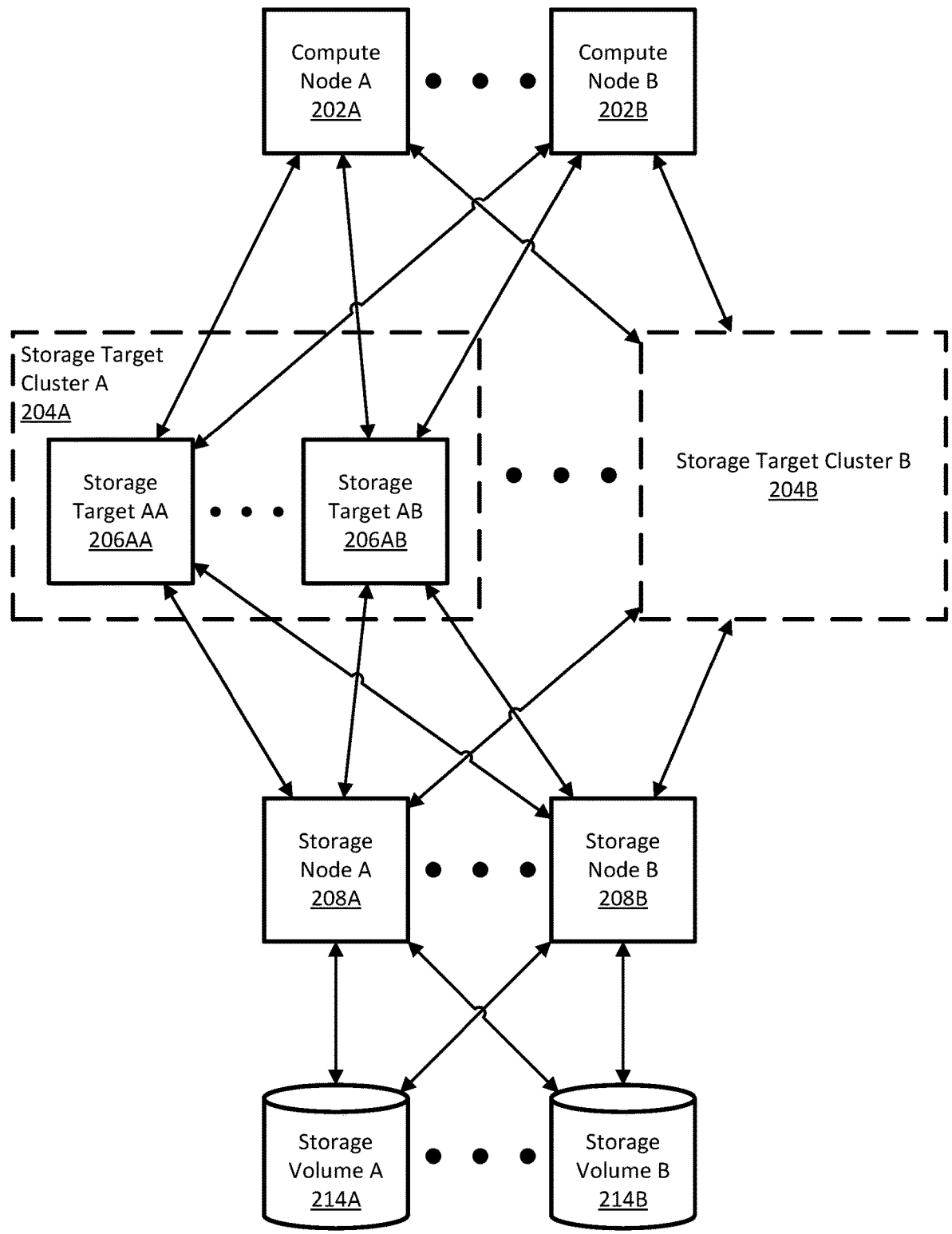
FIG. 2 shows a diagram of system, in accordance with one or more embodiments.

FIG. 2 shows a diagram of a system, in accordance with one or more embodiments. In one or more embodiments, a system may include one or more compute node(s) (202), one or more storage target cluster(s) (204) with one or more storage target(s) (206) therein, one or more storage node(s) (208), and one or more storage volume(s) (114). Each of these components is described below.

In one or more embodiments, a compute node (e.g., compute node A (202A), compute node B (202B)) is substantially similar to the compute node(s) discussed in the description of FIG. 1.

In one or more embodiments, a storage node (e.g., storage node A (208A), storage node B (208B)) is substantially similar to the storage node(s) discussed in the description of FIG. 1.

In one or more embodiments, a storage volume (e.g., storage volume A (214A), storage volume B (214B)) is substantially similar to the storage volume(s) discussed in the description of FIG. 1.

In one or more embodiments, a storage target cluster (e.g., storage target cluster A (204A), is a grouping of one or more storage target(s) (e.g., storage target AA (206AA), storage target AB (206AB)) that are grouped together based on shared access to the same storage node(s) (208) and/or same storage volume(s) (214). That is, a storage target cluster (204), more generally, may be associated with one or more storage node(s) (208) and/or storage volume(s) (214) and each storage target (206) created therein inherits the associative properties of the broader storage target cluster (204).

In one or more embodiments, a storage target (e.g., storage target AA (206AA), storage target AB (206AB)) is software configured to act as a logical storage endpoint that directs data access traffic to one or more storage node(s) (108). A storage target (206) may be executing as software on a compute node (202), a storage node (208), or any other node (not shown) operatively connected to the system.

In one or more embodiments, a storage target cluster (204) is a logical grouping of storage targets (206) and is not directly capable of 'connecting' to a compute node (202) or a storage node (208). Rather, compute nodes (202) and storage nodes (208) operatively connect to individual storage targets (206) within a storage target cluster (204). Specifically, in one or more embodiments, if a compute node (202) (or storage node (208)) is configured to operatively connect to any single storage target (206), the compute node (202) (or storage node (208)) will be configured to operatively connect to each storage target (206) in the same storage target cluster (204). Accordingly, for brevity and to avoid cluttering the figures, a compute node (202) (or storage node (208)) may be considered to be 'connected' to a storage target cluster (204) (e.g., as shown for storage target cluster B (204B) in FIG. 2), even though there would exist one or more connection(s) to one or more storage target(s) (206), individually, in the storage target cluster (204) (e.g., as shown for storage target cluster A (204A) in FIG. 2).

In one or more embodiments, the number of storage targets (206) in a storage target cluster (204) is set by the maximum number of connections the initiating compute node (202) may have. As a non-limiting example, if the compute node (202) (that caused the creation of the storage target cluster (204)) supports eight connections, the storage target cluster (204) is created to include eight storage targets (206). In one or more embodiments, any storage target (206) in the same storage target cluster (204), may act as a failover, load balance, or provide any form of redundancy to the other storage targets (206).

While FIG. 2 shows a specific configuration of a system, other configurations may be used without departing from the scope of the disclosed embodiments. Accordingly, embodiments disclosed herein should not be limited to the configuration of devices and/or components shown in FIG. 2.

Figure 3:
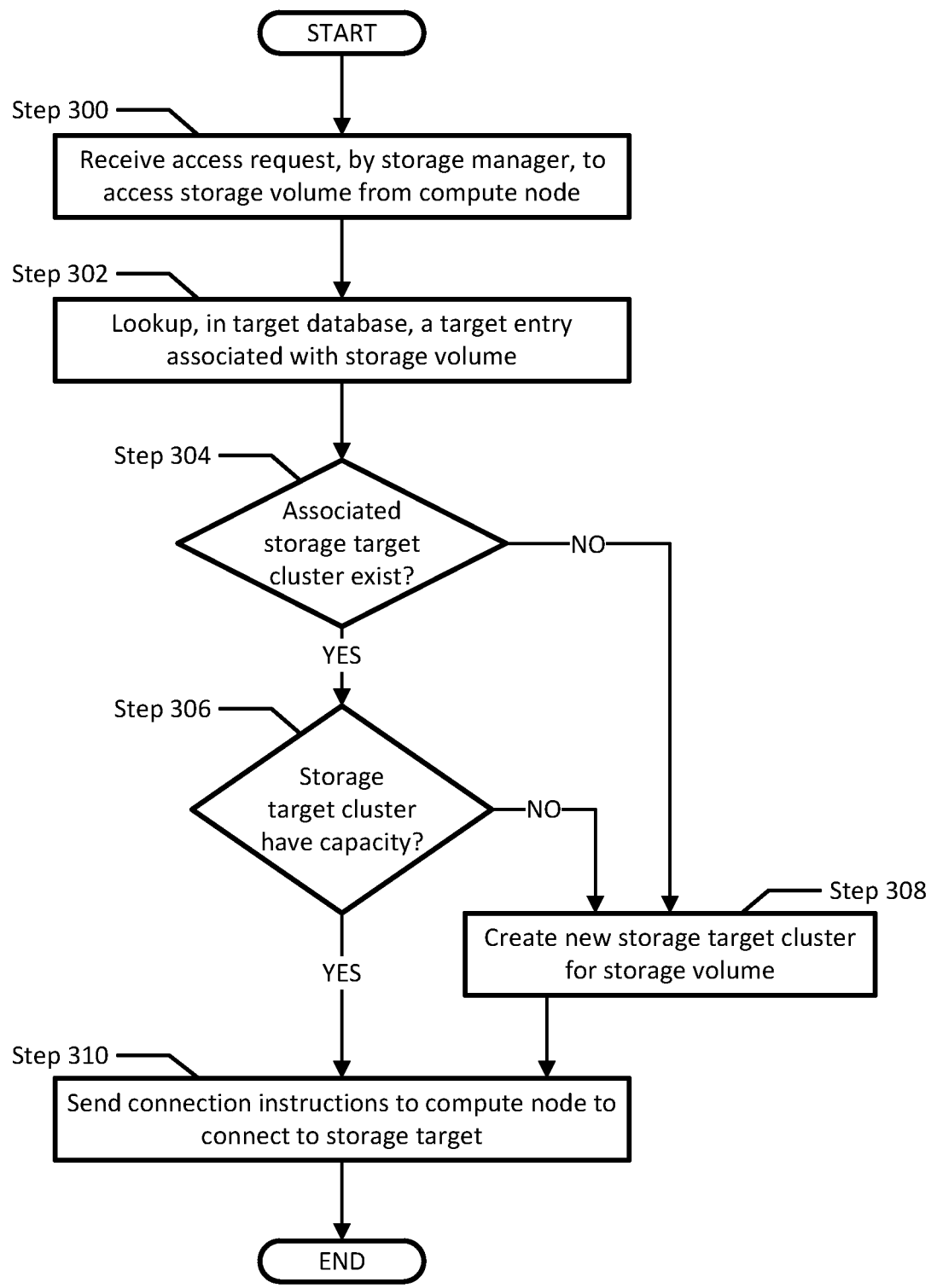
FIG. 3 shows a flowchart of a method of establishing a connection between a compute node and a storage target, in accordance with one or more embodiments.

FIG. 3 shows a flowchart of a method of establishing a connection between a compute node and a storage target, in accordance with one or more embodiments. All or a portion of the method shown may be performed by one or more components of the storage manager. However, another component of the system may perform this method without departing from the embodiment disclosed herein. While the various steps in this flowchart are presented and described sequentially, one of ordinary skill in the relevant art will appreciate that some or all of the steps may be executed in different orders, combined, or omitted, and some or all steps may be executed in parallel.

In Step 300, the storage manager receives an access request, from a compute node, to access a storage volume. In one or more embodiments, the access request may include (i) a storage volume identifier that uniquely identifies the storage volume, and (ii) a compute node identifier that uniquely identifies the compute node that generated the access request (e.g., an IP address, a hostname, etc.).

In Step 302, the storage manager performs a lookup, in the target database to identify a storage target cluster associated with the storage volume. In one or more embodiments, the storage manager uses the storage volume identifier (provided in the access request) and searches the target database to identify a target entry that includes a matching storage volume identifier.

In Step 304, the storage manager makes a determination if a storage target cluster exists that is associated with storage volume. In one or more embodiments, if the storage manager identifies a target entry (in the target database) that includes the same storage volume identifier included in the access request, the store manager determines that a storage target cluster exists for that storage volume. Alternatively, if the storage manager does not identify a target entry (in the target database) that includes the same storage volume identifier included in the access request, the store manager determines that a storage target cluster does not exist for that storage volume.

If the storage manager determines that a storage target cluster exists for the storage volume (Step 304—YES), the method proceeds to Step 306. However, if the storage manager determines that a storage target cluster does not exist for the storage volume (Step 306—NO), the method proceeds to Step 308.

In Step 306, the storage manager makes a determination if the identified storage target cluster has available remaining capacity to service the compute node. In one or more embodiments, the storage manager determines if the storage target cluster has available remaining capacity by analyzing the utilization data of the target entry (in the target database) previously identified in Step 304. In one or more embodiments, the storage manager bases the determination on a calculation where if adding the new connection would cause the workload on the storage target cluster to exceed a utilization threshold. Additional information regarding a utilization threshold may be found in the description of Step 402 of FIG. 4.

If the storage manager determines that the storage target cluster does not have any available remaining capacity (Step 306—NO), the method proceeds to Step 308. However, if the storage manager determines that the storage target cluster does have available remaining capacity (Step 306—YES), the method proceeds to Step 310.

In Step 308, the storage manager creates (or initiates the creation of) a new storage target cluster. In one or more embodiments, the storage manager creates a new storage target cluster by sending a creation command to a node (e.g., a storage node, a compute node, or another node) to generate a new storage target cluster for the identified storage volume. In one or more embodiments, the storage manager may be configured to prefer initiating the creation of a new storage target cluster on one of the storage nodes that hosts the data of the storage volume.

Further, upon the creation of the new storage target cluster, the storage manager modifies the target database to include a new target entry for the newly-created storage target cluster. The new target entry may include (i) a storage target cluster identifier that uniquely identifies the new storage target cluster, (ii) a storage volume identifier that uniquely identifies the storage volume, and (iii) utilization data which may be updated based on the measured, known, or probabilistic usage of the storage target cluster and/or the node hosting the storage target cluster.

In Step 310, the storage manager sends connection instructions to the compute node (the same compute node that sent the access request received in Step 300) to connect to the storage target cluster. The connection instructions may include (i) the storage target cluster identifier, (ii) the storage volume identifier, (iii) identifying information about the node hosting the storage connection cluster (e.g., an IP address), (iv) the port(s) at which the storage target(s) may be accessed (e.g., 8525-8550). In one or more embodiments, upon receipt of the connection instructions, the compute node may initiate a connection to the storage target cluster (i.e., initiate a connection to one or more of the storage targets therein).

Figure 4:
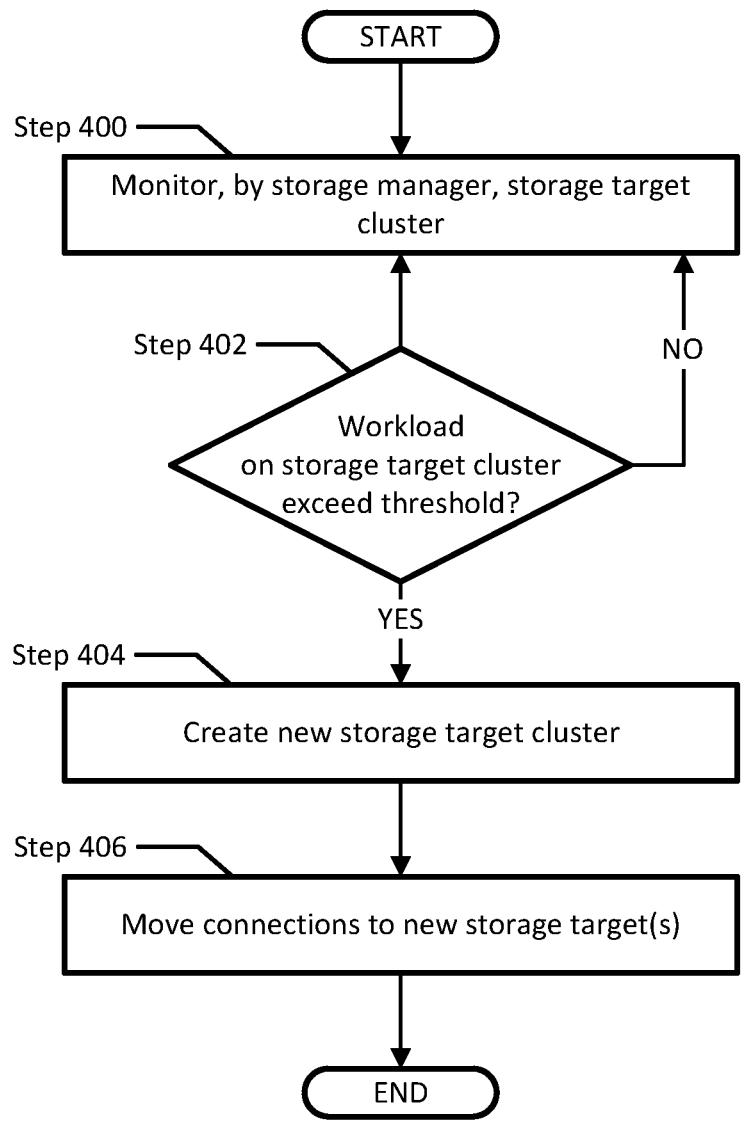
FIG. 4 shows a flowchart of a method of monitoring storage targets, in accordance with one or more embodiments.

FIG. 4 shows a flowchart of a method of monitoring storage targets, in accordance with one or more embodiments. All or a portion of the method shown may be performed by one or more components of the storage manager. However, another component of the system may perform this method without departing from the embodiment disclosed herein. While the various steps in this flowchart are presented and described sequentially, one of ordinary skill in the relevant art will appreciate that some or all of the steps may be executed in different orders, combined, or omitted, and some or all steps may be executed in parallel.

In Step 400, the storage manager monitors (i) traffic between nodes (e.g., compute nodes, storage nodes) and storage targets, and/or (ii) the resource utilization of the nodes hosting the storage target clusters. In one or more embodiments, the storage manager may request and receive (or otherwise obtain) utilization data from each node executing a storage target cluster, and/or each node (that is executing a storage target cluster) may publish (or otherwise 'push') utilization data to the storage manager. In turn, upon receipt of utilization data from any node, the storage manager updates the utilization data in the respective target entry in the target database.

In Step 402, the storage manager makes a determination if the workload for any storage target cluster exceeds a utilization threshold. In one or more embodiments, the storage manager compares the utilization data (in a target entry) against a utilization threshold to determine if the workload on that storage target cluster is above or below (or equal to) the desired upper limit. In one or more embodiments, the utilization threshold is set in the same units as the utilization data (e.g., percent processor usage, number of available/used connections, data transfer rate, percent memory usage, etc.). As used herein, the "workload" of a storage target cluster refers to connection capacity of the storage target cluster and/or the workload of the node hosting the storage target cluster.

If the storage manager determines that the workload for the storage target cluster (and/or on the host node) is below the utilization threshold (Step 402—NO), the method returns to Step 400. However, if the storage manager determines that the workload for the storage target cluster (and/or on the host node) is above the utilization threshold (Step 402—YES), the method proceeds to Step 404.

In Step 404, the storage manager creates a new storage target cluster. This step is substantially similar to Step 308 of FIG. 3, except that the storage volume (for the newly-created storage target cluster) is the same storage volume associated with the already-existing storage target cluster that is determined to exceed the utilization threshold (in Step 402).

In Step 406, the storage manager moves one or more connection from the already-existing storage target cluster to the newly-created storage target cluster. In one or more embodiments, the storage monitor may identify one or more connections that cause approximately half of the workload on the already-existing storage target cluster, then break those connection(s) (e.g., disconnect those compute nodes) and recreate those connection(s) (e.g., connect those compute nodes) to the newly-created storage target cluster. In one or more embodiments, the storage manager may only move one or more connection(s) from the already-existing storage target cluster in order to reduce the workload on the already-existing storage target cluster below the utilization threshold (e.g., 5%, 10%, 30% below the utilization threshold).

Figure 5:
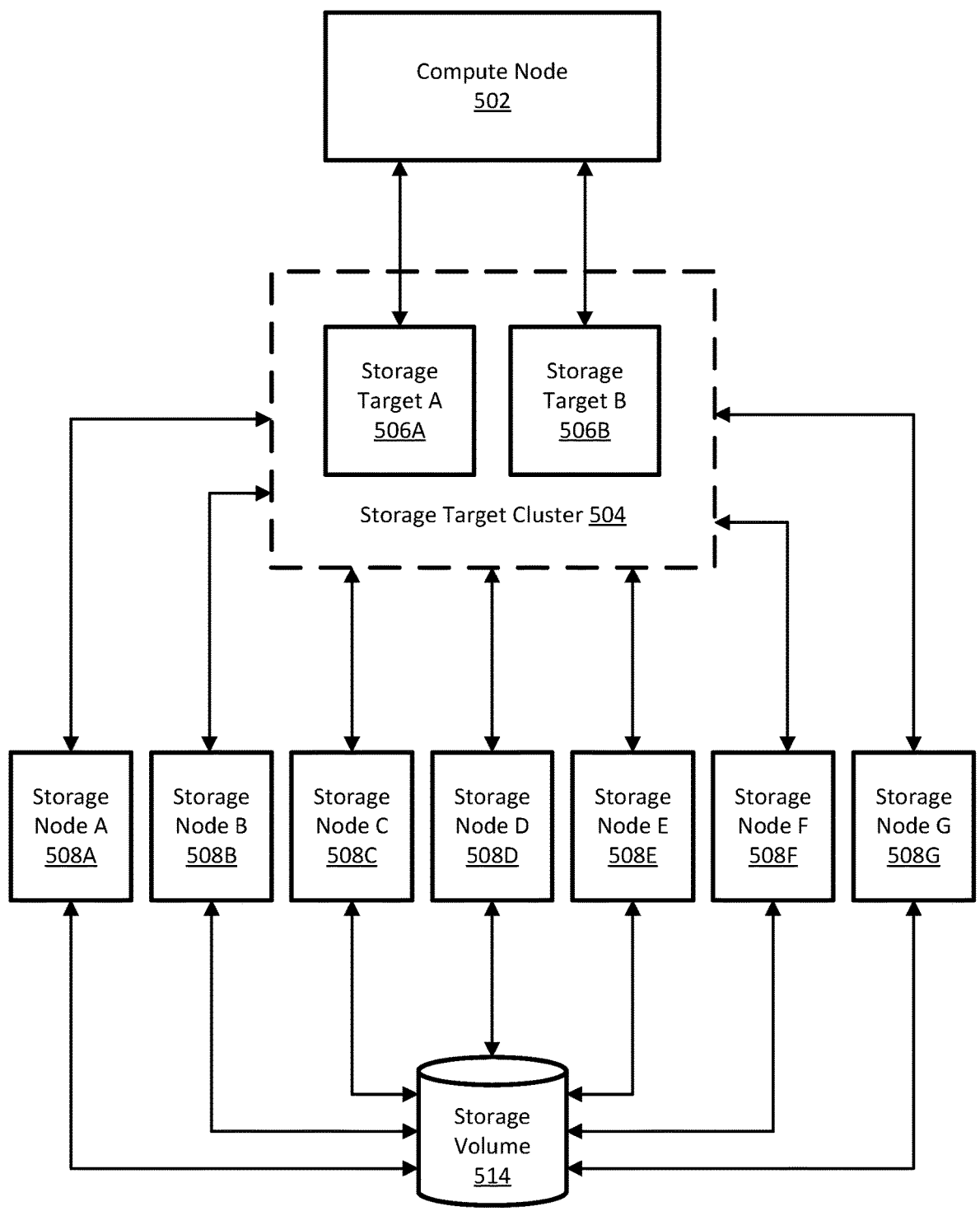
FIG. 5 shows an example of a system, in accordance with one or more embodiments.

FIG. 5 shows an example of a system, in accordance with one or more embodiments. In FIG. 5, consider a scenario where a storage volume (514) includes data that physically persists across memory and/or storage devices of seven different storage nodes (i.e., storage node A (508A), storage node B (508B), storage node C (508C), storage node D (508D), storage node E (508E), storage node F (508F), and storage node G (508G)). Further, to avoid cluttering the figure, each storage node (508) is shown connected to the storage target cluster (504) as a whole. However, in one or more embodiments, each storage node (508) is connected to each storage target (i.e., storage target A (506A) and storage target B (506B)) individually, for a total of fourteen connections between storage nodes (508) and the storage target cluster (504) (instead of the seven connections shown in FIG. 5).

In a conventional system (not shown), in order for the compute node (502) to access the storage volume (514), the compute node (502) would need to establish seven independent connections to each storage node (508), individually. Similarly, in order for another compute node (not shown) to access the storage volume (514), that other compute node would also have to establish another seven individual connections to each storage node (508).

However, as shown in the example of FIG. 5, a storage target cluster (504) exists for the storage volume (514). Accordingly, in order for the compute node (502) to connect to the storage volume (514), the compute node (502) only connects to the storage targets (i.e., storage target A (506A) and storage target B (506B)) of the storage target cluster (504) to access the storage volume (514). Thus, the compute node (502) only establishes two connections (instead of seven) thereby allowing the compute node (502) to save connection capacity for one or more other storage volume(s) (not shown) that may be accessed by the compute node (502). Further, if another compute node (not shown) establishes a connection to the storage volume (514), that other compute node would similarly establish only two connections (i.e., to storage target A (506A) and storage target B (506B)) in order to access the storage volume (514).

Thus, any connections to the storage volume (514) may be made through the unified endpoints of the storage targets (506) without needing to connect to (or even have knowledge of) the storage nodes (508) that persist the data of the storage volume (514).

Figure 6:
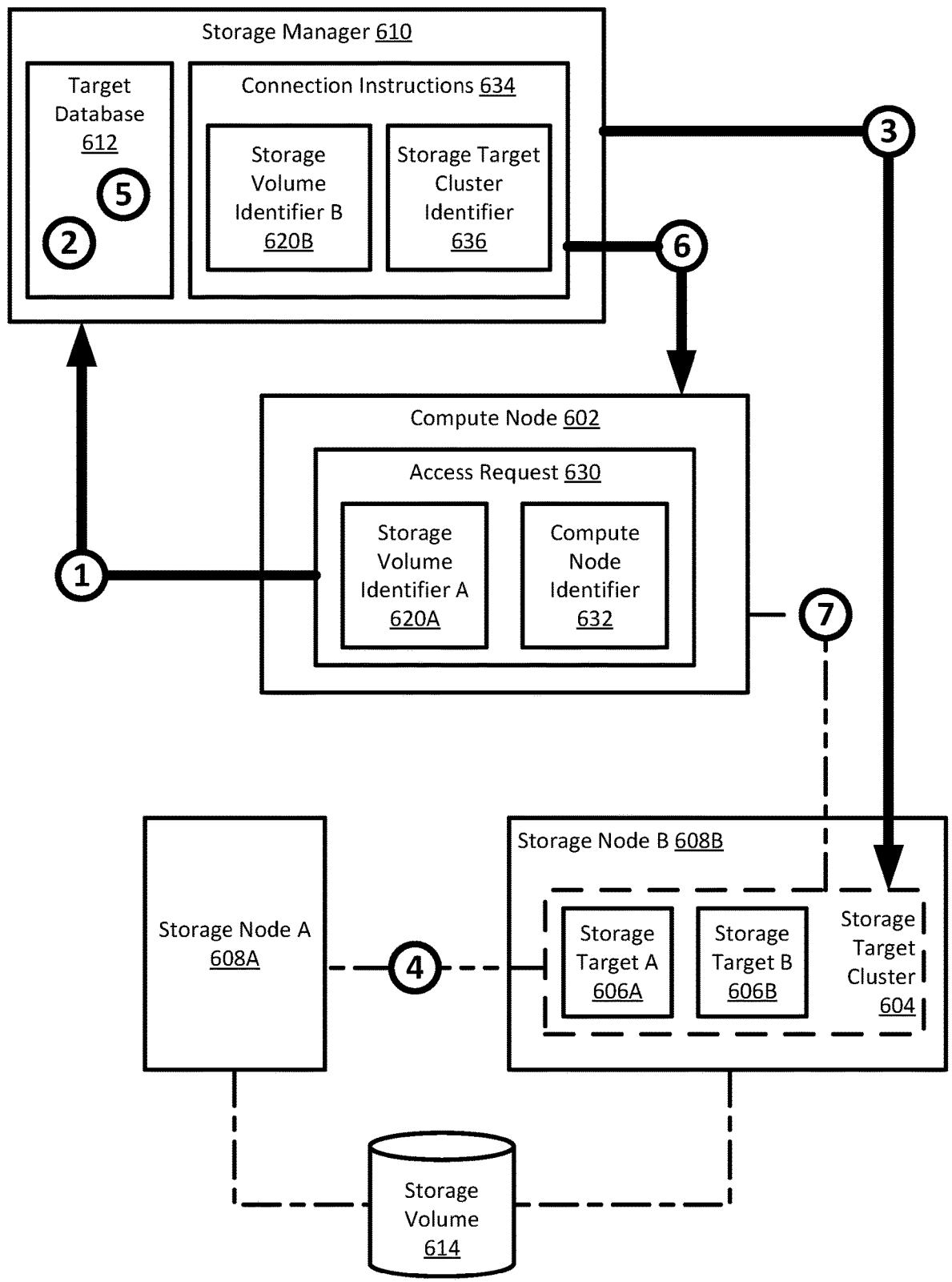
FIG. 6 shows an example of a system, in accordance with one or more embodiments.

FIG. 6 shows an example of a system, in accordance with one or more embodiments.

Consider a scenario where, at (1), a compute node (602) generates and sends an access request (630) to a storage manager (610). The access request (630) includes a storage volume identifier A (620A) that uniquely identifies the storage volume (614) and a compute node identifier (632) that uniquely identifies the compute node (602). The access request is transmitted via a network (not shown) that operatively connects the compute node (602) and the node (not shown) hosting the storage manager (610).

At (2), the storage manager (610) performs a lookup in the target database (612) to attempt to identify a storage target cluster that includes the same storage volume identifier (620A). However, in this example, the storage manager (610) fails to identify a target entry (not shown) in the target database (612) that includes storage volume identifier A (620A).

Accordingly, at (3), the storage manager (610) sends a creation command to storage node B (608B) to create a new storage target cluster (604) with two storage targets (storage target A (606A) and storage target B (606B)). The storage manager (610) and storage node B (608B) communicate via a network (not shown) operatively connecting both.

At (4), after creating the storage target cluster (604), storage node B (608B) connects both storage targets (storage target A (606A) and storage target B (606B)) to storage node A (608A) because the storage volume (614) persists across both storage node B (608B) and storage node A (608A) (to avoid cluttering the figure, only single connection is shown). Accordingly, a connection, by any node, to one or more storage target(s) (606) would then provide access to the storage volume (614).

At (5), the storage manager (610) updates the target database (612) to include a new target entry (not shown) for the storage target cluster (604). The target entry includes a storage volume identifier (not shown) that uniquely identifies the storage volume (614) and a storage target cluster identifier (not shown) that uniquely identifies the storage target cluster (604) by port number and storage node B (608B) by IP address.

At (6), the storage manager (610) sends connection instructions (634) to the compute node (602). The connection instructions (634) include storage volume identifier B (620B) and a storage target cluster identifier (636).

At (7), in response to receiving the connection instructions (634), the compute node (602) establishes a connection to storage target A (606A) and storage target B (606B) of the storage target cluster (604) (to avoid cluttering the figure, only single connection is shown). The compute node (602) establishes the connection by sending a request to connect to the IP address and port number provided in the connection instructions (634). The compute node (602) and storage node B (608B) communicate via a network (not shown) operatively connecting both. After the compute node (602) establishes a connection to storage target A (606A) and storage target B (606B), the compute node (602) has access (i.e., the ability to read and/or write) to the storage volume (614).

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for facilitating a connection to a storage volume, comprising:
   receiving, by a storage manager, an access request from a compute node, wherein the access request comprises a storage volume identifier associated with the storage volume,
      wherein the storage volume persists across a first number of storage nodes that is greater than a second number of connections the compute node is capable of maintaining;
   performing a lookup, in a target database, to identify a target entry comprising the storage volume identifier;
   making a first determination that the target database does not comprise the target entry; and
   based on the first determination:
      creating a first storage target cluster for the storage volume; and
      sending first connection instructions to the compute node, wherein the first connection instructions comprise a first storage target cluster identifier associated with the first storage target cluster.

2. The method of claim 1, wherein creating the first storage target cluster for the storage volume, comprises:
   identifying a first storage node that persists data of the storage volume; and
   sending a creation command to the first storage node, wherein the creation command comprises the storage volume identifier.

3. The method of claim 2, wherein after sending the creation command to the first storage node, the method further comprises:
   creating a new target entry, in the target database, comprising:
      the storage volume identifier; and
      the first storage target cluster identifier.

4. The method of claim 2, wherein after sending the first connection instructions to the compute node, the method further comprises:
   monitoring a workload of the first storage target cluster;
   making a second determination that the workload on the first storage target cluster exceeds a utilization threshold; and
   based on the second determination:
      creating a second storage target cluster for the storage volume; and
      sending second connection instructions to the compute node, wherein the second connection instructions comprise a second storage target cluster identifier associated with the second storage target cluster.

5. The method of claim 4, wherein the second storage target cluster is executing on a second storage node, wherein the second storage node comprises more resource capacity than the first storage node.

6. The method of claim 4, wherein monitoring the workload of the first storage target cluster, comprises:
   obtaining utilization data of the first storage node.

7. The method of claim 1, wherein after sending the first connection instructions to the compute node, the method further comprises:
   receiving a second access request from a second compute node, wherein the second access request comprises the storage volume identifier;
   performing a second lookup, in the target database, to identify the target entry comprising the storage volume identifier;
   making a second determination that the target database does comprise the target entry; and
   based on the second determination:
      sending second connection instructions to the second compute node, wherein the second connection instructions comprise the first storage target cluster identifier associated with the first storage target cluster.

8. A non-transitory computer readable medium comprising instructions which, when executed by a processor, enables the processor to perform a method for facilitating a connection to a storage volume, comprising:
   receiving, by a storage manager, an access request from a compute node, wherein the access request comprises a storage volume identifier associated with the storage volume;
   performing a lookup, in a target database, to identify a target entry comprising the storage volume identifier;
   making a first determination that the target database does not comprise the target entry; and
   based on the first determination:
      creating a first storage target cluster for the storage volume comprising:
         identifying a first storage node that persists data of the storage volume; and
         sending a creation command to the first storage node, wherein the creation command comprises the storage volume identifier; and
      sending first connection instructions to the compute node, wherein the first connection instructions comprise a first storage target cluster identifier associated with the first storage target cluster.

9. The non-transitory computer readable medium of claim 8, wherein the storage volume persists across a first number of storage nodes that is greater than a second number of connections the compute node is capable of maintaining.

10. The non-transitory computer readable medium of claim 8, wherein after sending the creation command to the first storage node, the method further comprises:
    creating a new target entry, in the target database, comprising:

the storage volume identifier; and
the first storage target cluster identifier.

11. The non-transitory computer readable medium of claim 8, wherein after sending the first connection instructions to the compute node, the method further comprises:
monitoring a workload of the first storage target cluster;
making a second determination that the workload on the first storage target cluster exceeds a utilization threshold; and
based on the second determination:
creating a second storage target cluster for the storage volume; and
sending second connection instructions to the compute node, wherein the second connection instructions comprise a second storage target cluster identifier associated with the second storage target cluster.

12. The non-transitory computer readable medium of claim 11, wherein the second storage target cluster is executing on a second storage node, wherein the second storage node comprises more resource capacity than the first storage node.

13. The non-transitory computer readable medium of claim 11, wherein monitoring the workload of the first storage target cluster, comprises:
obtaining utilization data of the first storage node.

14. The non-transitory computer readable medium of claim 8, wherein after sending the first connection instructions to the compute node, the method further comprises:
receiving a second access request from a second compute node, wherein the second access request comprises the storage volume identifier;
performing a second lookup, in the target database, to identify the target entry comprising the storage volume identifier;
making a second determination that the target database does comprise the target entry; and
based on the second determination:
sending second connection instructions to the second compute node, wherein the second connection instructions comprise the first storage target cluster identifier associated with the first storage target cluster.

15. A node, comprising:
memory; and
a processor executing a cluster storage manager, wherein the cluster storage manager is configured to perform a method for facilitating a connection to a storage volume, comprising:
receiving, by a storage manager, an access request from compute node, wherein the access request comprises a storage volume identifier associated with the storage volume;
performing a lookup, in a target database, to identify a target entry comprising the storage volume identifier;
making a first determination that the target database does not comprise the target entry; and
based on the first determination:
creating a first storage target cluster for the storage volume comprising:
identifying a first storage node that persists data of the storage volume; and
sending a creation command to the first storage node, wherein the creation command comprises the storage volume identifier;
creating a new target entry, in the target database comprising:
the storage volume identifier; and
the first storage target cluster identifier; and
sending first connection instructions to the compute node, wherein the first connection instructions comprise a first storage target cluster identifier associated with the first storage target cluster.

16. The node of claim 15, wherein the storage volume persists across a first number of storage nodes that is greater than a second number of connections the compute node is capable of maintaining.

* * * * *